United States Patent [19]

Ney et al.

[11] 4,020,190
[45] Apr. 26, 1977

[54] CHEESE FLAVOR CONTAINING ALKYL AMINES AND PROCESS OF FLAVORING

[75] Inventors: Karl Heinz Ney, Hamburg; I. Poetoe Gde Wirotama, Rellingen; Wolfram Gustav Freytag, Halstenbek, all of Germany

[73] Assignee: Lever Brothers Company, New York, N.Y.

[22] Filed: Dec. 9, 1974

[21] Appl. No.: 530,894

Related U.S. Application Data

[63] Continuation of Ser. No. 407,701, Oct. 18, 1973, abandoned, which is a continuation-in-part of Ser. No. 240,816, April 3, 1972, abandoned.

[30] Foreign Application Priority Data

Apr. 8, 1971 Luxembourg ............... 62955
Apr. 8, 1971 Luxembourg ............... 69954

[52] U.S. Cl. .................. 426/534; 426/535
[51] Int. Cl.$^2$ ...................... A23L 1/226
[58] Field of Search ............ 426/65, 534, 535

[56] References Cited

UNITED STATES PATENTS 2,920,965   1/1960   Zeigler et al. ............ 426/65 UX
3,520,699   7/1970   Henning et al. .............. 426/65

OTHER PUBLICATIONS

Zhurnal Analiticheskoi Khimii, 23, No. 5, (1968), pp. 766–770.
J. Dairy Science, 46, 1963, p. 598.
Fenaroli's Handbook of Flavor Ingredients, 1971, Edited by Furia et al., Chemical Rubber, Cleveland, pp. 741–742.

*Primary Examiner*—Joseph M. Golian
*Attorney, Agent, or Firm*—James J. Farrell; Melvin H. Kurtz

[57] ABSTRACT

A process for the preparation of a foodstuff having a ripe cheese flavor, which process includes admixing a food composition with a mixture of volatile cheese flavor ingredients having incorporated therein alkyl amines having 3–5 carbon atoms. The ripe cheese flavor is further improved by the addition of a mixture of amino acids to the volatile cheese flavor ingredients. An improved ripe Cheddar cheese flavor is obtaind by admixing said alkyl amines with alkanoic acids having 2–10 carbon atoms, containing 40–60% by weight hexanoic acid, not more than 40% by weight of alkanoic acids having 7–10 carbon atoms, and not more than 4% by weight of branched chain alkanoic acids having 4–5 carbon atoms. An improved ripe Emmental cheese flavor is obtained by admixing said alkyl amines with aldehydes having 7–9 carbon atoms and containing a phenyl group.

4 Claims, No Drawings

CHEESE FLAVOR CONTAINING ALKYL AMINES AND PROCESS OF FLAVORING

This application is a continuation of application Ser. No. 407,701, filed Oct. 18, 1973, now abandoned, which in turn is a continuation-in-part of application Ser. No. 240,816 filed Apr. 3, 1972, also abandoned.

The present invention relates to a process for preparing a foodstuff having a ripe cheese flavor, which process includes admixing a food composition with a mixture of volatile cheese flavor ingredients. The invention further relates to a foodstuff prepared by such a process and to a mixture of volatile cheese flavor ingredients which can be used in such a process.

In this specification ripe cheese is to be understood as cheese which has undergone changes in its composition by the action of microorganisms and/or enzymes. During the ripening of cheese many low-molecular weight compounds are formed such as alkanoic acids, 2-alkanones, 2-alkanols, aldehydes, amino acids, 2-oxoalkanoic acids and many other compounds wich attribute to the typical flavor of the different cheese varieties. In this specification flavor means both smell and taste.

In recent years, with the aid of chemical and physical analytical methods substantial progress has been made with the elucidation of the volatile and non-volatile flavor ingredients present in various kinds of cheese. Although in the past there has been the belief that one compound or group of compounds is responsible for a particular cheese flavor, for example Cheddar cheese flavor, the current theory is that a relatively small number of compounds is responsible for cheese flavor. The more important components include certain fatty acids, aldehydes, 2-alkanones, diacetyl, but other compounds such as amino acids, esters, alcohols probably have some effect on typical flavor. Thus, although different cheese varieties all possess a basic cheese flavor, and may have many compounds in common, it is only when the amounts and relative proportions are correct that a typical cheese flavor, e.g. Cheddar or Emmental, is obtained.

One group of compounds, the importance of which has been overlooked, is the amine group. Although aromatic amines such as tyramine and heterocyclic amines such as histamine were known for many years to be present in Cheddar cheese, the alkyl amines were only detected recently: Libbey and Day have tentatively identified n-propylamine (J. Dairy Science 46 (1963) 598) and Golovnya c.s. have identified alkyl amines in Russian cheese (Zhurnal Analiticheskoi Khimii, 23 (1968, No. 5) 766–70). But up to now people skilled in the art have not appreciated the importance of the amines for ripe cheese flavors, and consequently it has not been suggested to incorporate amines in mixtures of cheese flavor ingredients to be used for imparting a ripe cheese flavor to a food composition.

It has now been found that a more ripened cheese flavor can be imparted to food compositions, in particular young cheese processed cheese and processed cheese preparations, when the food compositions are admixed with an admixture of volatile cheese flavor ingredients containing alkyl amines having from 3 to 5 carbon atoms in addition to known cheese flavor ingredients. The alkyl amines can be prepared by organic syntheses or by isolation of natural products, optionally modified by chemical or microbiological reaction. However, the alkyl amines applied in a process according to the present invention do not include amines derived from natural ripened cheese, because it is an object of the present invention to impart to a food composition a ripe cheese flavor without the necessity of adding expensive ripened cheese or a product derived therefrom. Not only the amines, but also their salts, for example the alkyl ammonium chlorides such as propyl amine. HCl or pentyl amine. HCl can be used. Therefor, in this specification the term alkyl amines is to be understood as denoting the amines themselves as well as their salts. The amounts of salt used must be stoichiometric, which means that, for example, 59 parts by weight of propyl amine are equivalent to 95.5 parts by weight of propyl amine. HCl.

Accordingly, the present invention provides an improved process for preparing a foodstuff having a ripe cheese flavor, which process includes admixing a food composition with a mixture of volatile cheese flavor ingredients, which improvement comprises: (a) admixing alkyl amines having from 3 to 5 carbon atoms or salts thereof with known cheese flavor ingredients selected from the group consisting of (i) alkanoic acids having from 2 to 10 carbon atoms; (ii) 2-alkanones having from 5 to 13 carbon atoms; (iii) alkanals having from 2 to 10 carbon atoms; (iv) methyl and ethyl esters of alkanoic acids having from 4 to 10 carbon atoms; (v) methional; (vi) dimethylsulfide; and (vii) diacetyl; followed by (b) admixing the mixture of volatile cheese flavor ingredients so obtained with a food composition; in amounts such that the total amount of alkyl amines having from 3 to 5 carbon atoms is from 0.1 to 80 mg per kg foodstuff.

The invention further provides a foodstuff prepared by such a process.

Cheddar cheese flavor

A major embodiment of the present invention is a process for preparing a foodstuff having a ripe Cheddar cheese flavor which process includes admixing a food composition with a Cheddar cheese flavor composition.

In this specification 'Cheddar cheese' is to be understood to be a full-cream hard cheese, as e.g. made in the Cheddar Valley in the County of Somerset, England. Many of the publications on cheese flavor appear to deal with the flavor of Cheddar cheese. Forss and Patton have summarized the literature on Cheddar flavor published until 1966 in their article on the flavor of Cheddar cheese (Journal of Dairy Science, 49 (1966) 89–91 incorporated herein by reference). According to this article it had been found that various fatty acids constitute indispensable substances for the Cheddar flavor; it is stated that the ratio of acetic, butyric and caproic acids appear to be the most important, and possibly their optimum ratio is 8:1:0.3, or amounts of 900, 110 and 35 mg/kg. Furthermore, sulphurous compounds, e.g. 3-mercaptopropionic acid, are said to contribute to the Cheddar flavor. In stored Cheddar cheese up to 18 different amino acids have also been found.

Simulated Cheddar flavors have become known containing butyl butyryl lactate, isovaleric acid, ethyl butyrate, butyric acid, ammonium isovaleriate, lactic acid, hexanoic acid and propylene glycol; or butyl butyryl lactate, isovaleric acid, ethyl butyrate, butyric acid, hexanoic acid, 2-heptanone, alcohol (95%) and propylene glycol (J. Merory: Food Flavourings; Avi Publishing Comp.; 2nd Ed. (1968) 192 which is incorporated herein by reference). With mixtures of this kind, however, a satisfactory Cheddar flavor cannot be obtained. Furthermore, it is known to obtain a Chedder flavor by incorporating into foodstuffs, in addition to low-molecular weight, straight-chain fatty acids, one or more phenols, together with one or more lactones of aliphatic 4-, 5- or 6-hydroxyalkanoic acids having 4–22 carbon atoms and/or precursors thereof (U.S. Pat. No. 3,520,699 incorporated herein by reference).

In addition to the advantageous properties of alkyl amines on the ripe cheese flavor in general it has been found that the Cheddar cheese flavor of a foodstuff is further improved, i.e. changed in the direction of ripe Cheddar, if the alkanoic acids having from 2 to 10 carbon atoms, present in the mixture of volatile cheese flavor ingredients in addition to the alkyl amines having from 3 to 5 carbon atoms, include at least 50% by weight of alkanoic acids having more than 4 carbon atoms.

Preferably the alkanoic acids having from 2 to 10 carbon atoms include from 40 to 60% by weight of hexanoic acid, not more than 40% by weight of alkanoic acids having from 7 to 10 carbon atoms, and not more than 4% by weight of branched chain alkanoic acids having 4 or 5 carbon atoms.

Other preferred compounds of a cheddar cheese flavor composition are 2-alkanones having 5–13 carbon atoms or equivalent amounts of precursors thereof, such as 3-oxo-alkanoic acids, which are used in amounts such that the total concentration of 2-alkanones having 5–13 carbon atoms in the foodstuff is 0.4–60 mg/kg, preferably 0.8–48 mg/kg.

Further known cheese flavor ingredients which attribute to a ripe cheese flavor and can be used in a Cheddar cheese flavor composition according to the invention are 2-oxoalkanoic acids having from 2 to 6 carbon atoms, 2-oxoalkanedioic acids having 4 to 5 carbon atoms, methyl and ethyl esters of alkanoic acids having from 4 to 10 carbon atoms, aldehydes having from 2 to 10 carbon atoms and methional.

In addition compounds, such as indole, methylindole, phenylalkanoic acids, phenylalkenoic acids and gamma- or delta-lactones can be used. A suitable amount of the total above-mentioned ingredients of the Cheddar cheese flavor composition to be admixed with a food composition is in the range of 100–1,000 mg/kg, but preferably 200–800 mg/kg foodstuff.

A further improvement of the Cheddar flavor of a foodstuff can be obtained if succinic acid is admixed with a food composition in an amount of 500–2,000 mg/kg foodstuff.

The Cheddar taste can be further intensified by admixture of amino acids to a food composition. In our copending application Ser. No. 407,702 it is disclosed that a foodstuff having an improved ripe Cheddar flavor can be prepared, when in addition to a mixture of volatile cheese flavor ingredients glutamic acid, lysine and methionine are admixed with a food composition in amounts such that the concentration of each of glutamic acid, lysine and methionine is at least twice as large as that of any other free amino acid present. In that specification the term 'free amino acid' covers both the amino acid itself and a salt thereof. These can be interchanged, but in stoichiometric amounts. Preferably, a mixture of amino acids containing 30–60% monosodium glutamate, 5–30% methionine, and 65–10% lysine.HCl is admixed with the food composition. The total concentration of glutamic acid, lysine and methionine in the foodstuff can be from 250 to 32,000 mg/kg, preferably from 3,000 to 12,000 mg/kg foodstuff.

A preferred Cheddar cheese flavor composition which can be used in a process according to the present invention is one which comprises an admixture of
  i. from 0.1 to 1 part by weight of alkyl amines having from 3 to 5 carbon atoms or equivalent amounts of salts thereof; and
  ii. from 60 to 95 parts by weight of alkanoic acids having from 2 to 10 carbon atoms containing from 40 to 60% by weight of hexanoic acid, not more than 40% by weight of alkanoic acids having from 7 to 10 carbon atoms, and not more than 4% by weight of branched chain alkanoic acids having 4 or 5 carbon atoms; and optionally
  iii. from 0.4 to 6 parts by weight of 2-alkanones having from 5 to 13 carbon atoms;
  iv. from 0 to 35 parts by weight of 2-oxoalkanoic acids having from 2 to 6 carbon atoms and 2-oxoalkanedioic acids having 4 or 5 carbon atoms;
  v. from 0.1 to 2 parts by weight of aldehydes having from 2 to 10 carbon atoms;
  vi. from 0.01 to 0.1 parts by weight of methyl and ethyl esters of alkanoic acids having from 4 to 10 carbon atoms, and
  vii. from 0.001 to 0.01 parts by weight of methional.

The invention further provides a foodstuff having a ripe Cheddar cheese flavor and prepared by a process which includes admixing a food composition with a mixture of volatile cheese flavor ingredients, which foodstuff comprises
  i. from 0.2 to 8 mg/kg of alkyl amines having from 3 to 5 carbon atoms;
  ii. from 60 to 2,500 mg/kg of alkanoic acids having from 2 to 10 carbon atoms containing from 40 to 60% by weight of hexanoic acid, not more than 40% by weight of alkanoic acids having from 7 to 10 carbon atoms and not more than 4% by weight of branched chain alkanoic acids having 4 or 5 carbon atoms; and
  iii. from 0.4 to 60 mg/kg of 2-alkanones having from 5 to 13 carbon atoms; and optionally
  iv. from 500 to 2,000 mg/kg of succinic acid.

Emmental Chesse Flavor

Another major embodiment of the present invention is a process for preparing a foodstuff having a ripe Emmental cheese flavor which process includes admixing a food composition with an Emmental cheese flavor composition.

In this specification 'Emmental cheese' is to be understood to refer to a cheese as for example is prepared in the Berner Emmental in Switzerland. At present, however, the concept of 'Emmentaler' is no longer an indication of origin but a type indication for a kind of cheese and for a taste notion. In Germany such a hard cheese is generally indicated as 'Schweizerkaese', which indication is identical with the English notion 'Swiss cheese'. Previous attempts have been made to isolate the volatile neutral components of Swiss cheese and to incorporate part of the substances obtained thereby, viz. dimethylsulphide, diacetyl, acetaldehyde, 2-alkanones, esters from low-molecular weight alcohols and fatty acids, together with free fatty acids and a mixture of ten amino acids, into fresh cheese, in order to impart to it a flavor like Emmental cheese. Although with the flavor mixture in question an Emmental cheese-like flavor was obtained, this was still not fully satisfactory, because with this flavor mixture no high quality Emmental taste could be perceived (see J. E. Langler (1966); Dissertation Oregon State University (USA), pages 59–63 which is herein incorporated by reference).

It has now been found that a foodstuff having a typical flavor like ripe Emmental cheese of good quality is obtained when an Emmental cheese flavor composition containing aldehydes having from 7 to 9 carbon atoms and containing a phenyl group — hereinafter called "aromatic aldehydes" — in addition to the above-mentioned alkyl amines having from 3 to 5 carbon atoms, is admixed with a food composition. The aromatic aldehydes can be prepared by organic syntheses or by isolation of natural products, optionally modified by chemical or microbiological reaction. However the aromatic aldehydes according to the present invention do not include aldehydes derived from natural ripened cheese, because it is an object of the present invention to impart to a food composition a ripe Emmental cheese flavor without the necessity of adding expensive ripened cheese or a product derived therefrom. The amount of aromatic aldehydes admixed with a food composition can be from 0.2 to 18 mg aromatic aldehydes per kg foodstuff.

It is within the scope of the instant disclosure to use other known cheese flavor ingredients. Thus an Emmental cheese flavor composition according to the invention can contain known cheese flavor ingredients selected from alkanoic acids having from 2 to 8 carbon atoms, 2-alkanones having from 5 to 7 carbon atoms or equivalent amounts of precursors thereof such as 3-oxo-alkanoic acids, alkanals having from 2 to 6 carbon atoms, diacetyl (= butanedione), methional (=4-thiapentanal), dimethylsulphide, 2-oxoalkanoic acids having from 2 to 6 carbon atoms and 2-oxoalkanedioic acids having 4 or 5 carbon atoms, and methyl and ethyl esters of alkanoic acids having from 4 to 10 carbon atoms, in addition to the above-mentioned alkyl amines and aromatic aldehydes. A suitable amount to be admixed with a food composition is in the range of from 500 to 8,000 mg/kg, but preferably from 2000 to 6000 mg/kg foodstuff.

The Emmental taste can be further intensified by admixture of amino acids to a food composition. In our co-pending application Ser. No. 407,702 it is disclosed that a foodstuff having an improved ripe Emmental flavor can be prepared when in addition to a mixture of volatile cheese flavor ingredients, glutamic acid, glycine and lysine (whereby glycine can be replaced partially or completely by alanine or proline or both) are admixed with a food composition in amounts such that the concentration of each of glutamic acid, glycine and lysine (alanine and proline calculated as glycine substitutes) is at least twice as large as that of any other free amino acid present. Preferably, a mixture of amino acids containing 40–50% monosodium glutamate, 40–50% glycine (which glycine can be replaced partially or completely by alanine or proline or both) and 10–20% lysine. HCl is admixed with the food composition. The total concentration of glutamic acid, glycine and lysine (alanine and proline being calculated as glycine substitutes) in the foodstuff can be from 500 to 40,000 mg/kg, preferably from 6000 to 30,000 mg/kg foodstuff.

A preferred Emmental cheese flavor composition to be used in a process as described above is one which has been prepared by admixing i. from 0.01 to 1 part by weight of alkyl amines having from 3 to 5 carbon atoms or equivalent amounts of salts thereof;

ii. from 0.01 to 0.3 parts by weight of aldehydes having from 7 to 9 carbon atoms and containing a phenyl group; and iii. from 97.0 to 99.9 parts by weight of alkanoic acids having from 2 to 6 carbon atoms; and optionally iv. from 0.01 to 0.5 parts by weight of 2-alkanones having from 5 to 7 carbon atoms;

v. from 0.01 to 1 part by weight of alkanals having from 2 to 6 carbon atoms;

vi. from 0.1 to 10 parts by weight of 2-oxoalkanoic acids having from 2 to 6 carbon atoms and 2-oxoalkanedioic acids having 4 or 5 carbon atoms;

vii. from 0.01 to 0.1 part by weight of methyl and ethyl esters of alkanoic acids having from 4 to 10 carbon atoms;

viii. from 0.01 to 0.5 parts by weight of diacetyl;

ix. from 0.001 to 0.01 part by weight of methional, and x. from 0.001 to 0.1 part by weight of dimethylsulfide.

The instant invention further provides a foodstuff having an Emmental cheese flavor prepared according to a process as described above.

The most important food compositions to which a flavor of ripe cheese, for example Cheddar cheese or Emmental cheese, is imparted according to the invention are the following cheese products, viz. young cheese, processed cheese, particularly processed cheese prepared from young, relatively tasteless raw cheese, processed cheese preparation, quark, margarine cheese, creamed cheese, cheese fondu, cheese powder or the like. However, the cheese flavor compositions according to the invention can also be added to other food compositions in which a cheese flavor is desired, such as for example soups, sauces, pies, sandwich spreads, cheese pastries, pizza or similar foodstuffs.

Examples of alkyl amines having 3–5 carbon atoms which can be used in accordance with the present invention are propyl amine, butyl amine, 2-methylpropyl amine, pentyl amine, 2-methylbutyl amine and 3-methylbutyl amine.

Known cheese flavor ingredients that may be added to the Cheddar or Emmental flavor compositions of the instant invention can be selected from the following, i.e. alkanoic acids: acetic acid, propionic acid, butyric acid, isobutyric acid, pentanoic acid, 2-methylbutanoic acid, 3-methylbutanoic acid, hexanoic acid, heptanoic acid, octanoic acid, nonanoic acid and decanoic acid; 2-alkanones: butanone, 2-pentanone, 2-heptanone, 2-octanone, 2-nonanone, 2-undecanone, and 2-tridecanone; 2-oxoalkanoic and 2-oxoalkanedioic acids: 2-oxoethanoic acid (glyoxylic acid), 2-oxopropanoic acid (pyruvic acid), 2-oxo-3-methylbutanoic acid (2-oxoisovaleric acid), 2-oxo-4-methylpentanoic acid (2-oxoisocaproic acid), 2-oxobutanedioic acid (oxalacetic acid), and 2-oxopentanedioic acid (2-oxoglutaric acid); alkanals: ethanal, propanal, butanal, 2-methylpropanal, 2-methylbutanal, 3-methylbutanal, heptanal, and decanal; aromatic aldehydes: benzaldehyde, phenylethanal, phenylpropanal, and 3-phenylpropenal; methyl and ethyl esters of alkanoic acids: methyl and ethyl hexanoate and ethyl butanoate.

In this specification percentages and ratios are by weight, unless ontherwise stated. The invention is illustrated by the following examples without being limited thereto.

EXAMPLE I

A volatile Cheddar cheese flavor composition was made by mixing of

| | | | |
|---|---|---|---|
| acetic acid | 13.38 | 2-pentanone | 2.68 |
| butyric acid | 8.14 | 2-heptanone | 2.68 |
| isobutyric acid | 2.676 | 2-nonanone | 2.68 |
| pentanoic acid | 3.88 | 2-undecanone | 2.68 |
| 3-methylbutanoic acid | 3.566 | 2-tridecanone | 2.68 |
| hexanoic acid | 336.24 | 5-decanolide | 0.89 |
| heptanoic acid | 7.7 | 5-dodecanolide | 0.89 |
| octanoic acid | 112.06 | methional | 0.072 |
| nonanoic acid | 5.72 | indole | 0.144 |
| decanoic acid | 168.18 | cinnamic acid | 0.038 |
| 2-oxoethanoic acid | 89.16 | propyl amine | 0.334 |
| 2-oxopropanoic acid | 36.92 | butyl amine | 0.334 |
| 2-oxo-3-methylbutanoic acid | 21.86 | 2-methylpropyl amine | 0.334 |
| 2-oxo-4-methylpentanoic acid | 55.46 | pentyl amine | 0.334 |
| 2-oxobutanedioic acid | 67.22 | 3-methylbutyl amine | 0.334 |
| 2-oxopentanedioic acid | 50.4 | ammonia | 0.334 |

The figures indicate parts per thousand of flavoring composition.

EXAMPLE II

A volatile Cheddar cheese flavor composition was made by mixing of

| | | | |
|---|---|---|---|
| acetic acid | 122 | 2-pentanone | 2 |
| propionic acid | 20 | 2-heptanone | 2 |
| butyric acid | 40 | 2-nonanone | 2 |
| isobutyric acid | 5 | 2-undecanone | 2 |
| pentanoic acid | 6 | indole | 0.2 |
| 3-methylbutanoic acid | 5 | 3-methylindole | 0.02 |
| hexanoic acid | 200 | ethanal | 2 |
| cinnamic acid | 0.01 | propanal | 1 |
| phenylacetic acid | 0.01 | butanal | 1 |
| 3-phenylpropanoic acid | 0.1 | pentanal | 1 |
| ethyl butanoate | 0.1 | phenylethanal | 1 |
| ethyl hexanoate | 0.3 | propyl amine | 0.3 |
| diacetyl | 1.5 | butyl amine | 0.3 |
| methional | 0.05 | 2-methylpropyl amine | 0.3 |
| dimethylsulfide | 0.1 | pentyl amine | 0.3 |
| | | 3-methylbutyl amine | 0.3 |

The figures indicate parts by weight.

EXAMPLE III

A volatile Cheddar cheese flavor composition was made by mixing of the same compounds and in the same proportions as in Example II, except that indole and 3- methylindole were omitted.

EXAMPLE IV

A Cheddar cheese flavor composition similar to that of Example II was prepared, except that cinnamic acid, phenylacetic acid, and 3-phenylpropanoic acid were omitted.

EXAMPLE V

A Cheddar cheese flavor composition similar to that of Example II was prepared, except that ethanal, propanal, butanol, pentanal and phenylethanal were omitted.

EXAMPLE VI 100 g of young, non-ripened cheese curd was intensively mixed with 600 mg/kg of the Cheddar cheese flavor composition of Example I. A product was obtained having a clear Cheddar-like taste.

EXAMPLE VII 100 g young, non-ripened cheese curd was flavoured as in Example VI, but additionally 5000 mg/kg of a mixture of amino acids consisting of 435 parts monosodium L-glutamate, 377 parts L-lysine.HCl, and 188 parts DL-methionine was added. A product was obtained having a rounded taste of ripe Cheddar cheese.

Comparative Experiment

Example VII was repeated, except that a volatile Cheddar cheese flavor composition was used which only differed from that of Example I in that it did not contain the alkyl amines. Although the processed cheese had a flavor similar to Cheddar cheese, the overall flavor of the product was considered to be less than that of Example VII.

EXAMPLES VIII – XI

The procedure of Example VI was repeated, except that the Cheddar cheese flavor compositions of Examples II–V were used respectively. All products had a typical Cheddar flavor, but the product containing the composition of Example II was judged to have the best flavor.

EXAMPLE XII

From 100 g young Cheddar cheese, 64 g of water and 3 g of melting salt consisting of a commercially available mixture of polyphosphates, a processed cheese was prepared in a casserole under stirring and with careful heating to 80° C stirring was continued for 10 minutes and then 300 mg/kg of the flavor composition of Example I was added to the melting mass which was cooling. A processed cheese was obtained with a typical Cheddar taste which when taste-tested by a panel of experst was given 5 points out of a maximum of 8.

EXAMPLE XIII

From 100 g young Cheddar cheese a processed cheese was prepared as in Example XII, but flavored this time with 600 mg/kg of the same flavor composition. The processed cheese obtained was better with respect to taste than that of Example XII and was given 6 points in the taste test.

EXAMPLE XIV

Processed cheese was prepared as in Example XIII, but this time also 30,000 mg/kg of the same mixture of amino acids as used in Example VII were added. The product obtained had an excellent rounded taste like that of a processed cheese from ripe Cheddar and was given 7 points for taste.

EXAMPLE XV

Processed cheese was prepared as in Example XIV, and to it was added 600 mg/kg succinic acid. The processed cheese was given 7.5 points for taste.

EXAMPLE XVI 100 g young cheese, to which were added 25% whey powder and 20,000 mg/kg of the same mixture of amino acids as used in Example VII was treated in a known manner, worked up to processed cheese and intensively mixed with 600 mg/kg of the flavor composition of Example II. The final product had an excellent rounded taste like that of processed cheese form ripe Cheddar cheese.

EXAMPLE XVII 150 g yound Cheddar comminuted in a mincing machine, 4.5 g melting salt, 1.2 g (i.e. 3,000 mg/kg) of the same mixture of amino acids as used in Example VII and 0.5 g NaCl were heated au bain-marie while ¼ hot milk was added slowly. Then 120 mg (i.e. about 300 mg/kg) of the cheddar cheese flavor composition of Example II was added together with pepper to taste. A cream-cheese sauce was obtained having an excellent Cheddar taste.

EXAMPLE XVIII

A volatile Emmental cheese flavor composition was made by mixing of

| acetic acid | 350.00 | butanone | 0.31 |
|---|---|---|---|
| propionic acid | 594.63 | 2-pentanone | 0.16 |
| butyric acid | 26.00 | 2-heptanone | 0.07 |
| isobutyric acid | 1.58 | ethanal | 0.20 |
| 2-methylbutanoic acid | 8.11 | 3-methylbutanal | 0.10 |
| 3-methylbutanoic acid | 0.97 | benzaldehyde | 0.06 |
| hexanoic acid | 17.04 | phenylethanal | 0.04 |
| ethyl butanoate | 0.10 | propyl amine | 0.05 |
| methyl hexanoate | 0.24 | butyl amine | 0.05 |
| diacetyl | 0.13 | 2-methylpropyl amine | 0.05 |
| methional | 0.01 | pentyl amine | 0.05 |
| | | 3-methylbutyl amine | 0.05 |

The figures indicate parts per thousand of flavor composition.

The figures indicate parts per thousand of flavor composition.

EXAMPLE XIX

A volatile Emmental cheese flavor composition was made by mixing of

| acetic acid | 1862 | 2-pentanone | 0.98 |
|---|---|---|---|
| propionic acid | 3960 | 2-heptanone | 0.45 |
| butyric acid | 165 | ethanal | 1.4 |
| isobutyric acid | 5 | 3-methylbutanal | 0.42 |
| 2-methylbutanoic acid | 50 | benzaldehyde | 0.25 |
| 3-methylbutanoic acid | 6 | phenylethanal | 0.25 |
| hexanoic acid | 58 | propyl amine | 0.3 |
| octonoic acid | 47 | butyl amine | 0.3 |
| diacetyl | 0.8 | 2-methylpropylamine | 0.3 |
| methional | 0.05 | pentyl amine | 0.3 |
| dimethylsulfide | 0.11 | 3-methylbutyl amine | 0.3 |

The figures indicate parts by weight.

EXAMPLE XX

A volatile Emmental cheese flavor composition was made by mixing of the same compounds and in the same proportions as in Example XIX, except that diacetyl and methional were omitted and 0.6 parts ethyl butanoate and 1.5 parts methyl hexanoate were added.

EXAMPLE XXI

An Emmental cheese flavor composition similar to that of Example XIX was prepared, except that dimethylsulfide was omitted and 0.6 parts ethyl butanoate and 1.5 parts methyl hexanoate were added.

EXAMPLE XXII

A processed cheese was prepared conventionally starting from 100 g young Cheddar, 64 g water, 3 g melting salt (a commercial mixture of polyphosphates). To this processed cheese 6000 mg/kg of the Emmental cheese flavor composition of Example XVIII were added. After stirring for 10 minutes at 80° C the mixture was allowed to cool. The processed cheese so obtained had a very good Emmental flavor.

EXAMPLE XXIII

A processed cheese was made as described in Example XXII, except that before melting 16,000 mg/kg of a mixture of amino acids consisting of 40 parts monosodium L-glutamate, 50 parts glycine and 10 parts L-lysine.HCl was added. The product obtained had a full Emmental flavor and the taste was more intensive than that of the product of Example XXII.

EXAMPLE XXIV-XXVI

The procedure of Example XXII was repeated, except that the Emmental cheese flavor compositions of Examples XIX-XXI were used, respectively. All products had a typical Emmental flavor, but the product containing the composition of Example XIX was preferred.

EXAMPLE XXVII

Young German Cheddar was heated in 10 minutes to 90° C in the melting vessel with stirring (230 rpm), during which butter, melting salt and 10% processed cheese were added, and the melted product obtained was kept for 10 minutes at this temperature. During the stirring operation 6238 mg/kg of the Emmental cheese flavor composition of Example XIX and 27,580 mg/kg of the amino acid mixture as used in Example XXIII were added. Subsequently the contents of the melting vessel were evacuated for 2 minutes of the hot-keeping time at 0.6 atm., and then cooled down. The processed cheese had a pleasant and fully rounded taste of Emmental cheese.

EXAMPLE XXVIII

The same procedure was followed as in Example XXVII except that to the melted product 27, 580 mg/kg of a mixture of amino acids consisting of 44 parts monosodium L-glutamate, 45 parts glycine, 0.8 parts l-proline and 10.2 parts L-lysine.HCl was added. A processed cheese having a very good Emmental taste was obtained, which could hardly be distinguished from natural cheese.

EXAMPLE XXIX 150 g young Cheddar comminuted in a mincer, 4.5 g melting salt, 3 g — that is about 6500 mg/kg — of the mixture of amino acids as used in Example XXVIII and 0.5 g cooking salt were heated on the water bath with slow addition of 1/4 l of hot milk. Then 0.9 g — that is about 2000 mg/kg — of the Emmental cheese flavor composition of Example XVIII was added and the taste was rounded with pepper. A cheese cream sauce was obtained having an excellent Emmental taste.

EXAMPLE XXX

To processed cheese prepared in the usual way from young Emmental cheese, 14,000 mg/kg of the amino acid mixture as used in Example XXIII and 6000 mg/kg of the flavor composition of Example XVIII were added. A product was obtained which in taste was identical with the processed cheese prepared from fully ripe Emmental cheese.

Comparative Experiment

Example XXIII was repeated, except that an Emmental cheese flavor composition similar to that of Example XVIII, but not containing the alkyl amines, benzaldehyde and phenylethanal, was used. Although the processed cheese had a flavor similar to Emmental cheese, the overall flavor of the product was considered to be less than that of Example XXIII, which is in agreement with the results of J. E. Langler (1966).

What we claim is:

1. A ripe Cheddar cheese flavoring composition consisting essentially of:
   i. from 0.1 to 1 part by weight of alkyl amines having from 3 to 5 carbon atoms or equivalent amounts of salts thereof; and
   ii. from 60 to 95 parts by weight of alkanoic acids having from 2 to 10 carbon atoms containing from 40 to 60% by weight of hexanoic acid, not more than 40% by weight of alkanoic acids having from 7 to 10 carbon atoms, and not more than 4% by weight of branched chain alkanoic acids having 4 or 5 carbon atoms; and
   iii. from 0.4 to 6 parts by weight of alkanones having from 5 to 13 carbon atoms;
   iv. from 0 to 35 parts by weight of 2-oxoalkanoic acids having from 2 to 6 carbon atoms and 2-oxoalkanedioic acids having 4 or 5 carbon atoms;
   v. from 0 to 2 parts by weight of aldehydes having from 2 to 10 carbon atoms;
   vi. from 0 to 0.1 parts by weight of methyl and ethyl esters of alkanoic acids having from 4 to 10 carbon atoms, and
   vii. from 0 to 0.01 parts by weight of methional.

2. A process for preparing a foodstuff having a ripe Cheddar cheese flavor, which comprises admixing a food composition selected from the group consisting of young cheese, processed cheese, processed cheese preparation, quark, margarine cheese, creamed cheese, cheese fundu, cheese powder, soups, sauces, pies, sandwich spreads, cheese pastries and pizza, with
   i. a Cheddar cheese flavoring composition according to claim 1 in an amount of from 100 to 1,000 mg/kg foodstuff, and
   ii. succinic acid in an amount of from 0 to 2,000 mg/kg foodstuff.

3. A process for preparing a ripe Emmental cheese flavoring composition, which comprises admixing
   i. from 0.01 to 1 part by weight of alkyl amines having from 3 to 5 carbon atoms or equivalent amounts of salts thereof;
   ii. from 0.01 to 0.3 parts by weight of aldehydes having from 7 to 9 carbon atoms and containing a phenyl group;
   iii. from 97.0 to 99.9 parts by weight of alkanoic acids having from 2 to 8 carbon atoms;
   iv. from 0 to 0.5 parts by weight of 2-alkanones having from 5 to 7 carbon atoms;
   v. from 0 to 1 part by weight of alkanals having from 2 to 6 carbon atoms;
   vi. from 0 to 10 parts by weight of 2-oxoalkanoic acids having from 2 to 6 carbon atoms and 2-oxoalkanedioic acids having 4 or 5 carbon atoms;
   vii. from 0 to 0.1 part by weight of methyl and ethyl esters of alkanoic acids having from 4 to 10 carbon atoms;
   viii. from 0 to 0.5 parts by weight of diacetyl;
   ix. from 0 to 0.01 part by weight of methional, and
   x. from 0 to 0.01 part by weight of dimethylsulfide.

4. A process for preparing a foodstuff having a ripe Emmental cheese flavor, which comprises admixing a food composition selected from the group consisting of young cheese, processed cheese, processed cheese preparation, quark, margarine cheese, creamed cheese, cheese fondu, cheese powder, soups, sauces, pies, sandwich spreads, cheese pastries and pizza, with an Emmental cheese flavoring composition according to the process defined in claim 3 in an amount of from 500 to 8,000 mg/kg foodstuff.

* * * * *